United States Patent [19]

Kulpmann et al.

[11] 4,140,010

[45] Feb. 20, 1979

[54] LOAD TEST APPARATUS FOR HOISTING UNITS BY MEANS OF STRAIN GAGES

[75] Inventors: Robert Külpmann, Wetter; Peter Stehr, Hagen; Karl Zacharias, Schwerte; Paul Müller, Wetter, all of Fed. Rep. of Germany

[73] Assignee: DEMAG Aktiengesellschaft, Duisburg, Fed. Rep. of Germany

[21] Appl. No.: 829,921

[22] Filed: Sep. 1, 1977

[30] Foreign Application Priority Data

Sep. 3, 1977 [DE] Fed. Rep. of Germany ....... 2639762

[51] Int. Cl.2 ................................................ G01L 1/22

[52] U.S. Cl. .................................. 73/141 A; 177/147; 338/5

[58] Field of Search ..................... 73/141 A; 177/147; 212/2; 338/5

[56] References Cited

U.S. PATENT DOCUMENTS

| | | | |
|---|---|---|---|
| 2,434,138 | 1/1948 | Adams | 177/147 X |
| 2,513,295 | 7/1950 | Eisenberg | 338/5 X |
| 4,059,012 | 11/1977 | Pietzsch et al. | 338/5X |

FOREIGN PATENT DOCUMENTS

| | | | |
|---|---|---|---|
| 1078785 | 3/1960 | Fed. Rep. of Germany | 73/141 A |
| 2301186 | 7/1974 | Fed. Rep. of Germany | 73/141 A |
| 2318618 | 11/1974 | Fed. Rep. of Germany | 212/2 |

*Primary Examiner*—Charles A. Ruehl
*Attorney, Agent, or Firm*—Mandeville and Schweitzer

[57] ABSTRACT

The invention refers to a load test apparatus for hoisting units by means of strain gages, where the test data affect the transmission of a hoisting unit motor. That is, a load test cell is positioned between the fixed support for the hoisting unit and the hoisting cable. The cell is mounted with an upper bolt connecting it to the fixed support and a lower bolt connecting it to the fixed support and the hoisting cable. In the area between the two bolts the flat cell is of restricted cross section and test gages are mounted here to monitor tensile forces in the cell according to the load. The gages are connected, in turn, through a bridging circuit incorporating resistances to the hoist drive. Because of the simplicity and size of the test structure, it can be manufactured economically by simple mass production techniques.

11 Claims, 8 Drawing Figures

1
1a
1b
1c
2
2a
3
4
5
6
13
III

LOAD TEST APPARATUS FOR HOISTING UNITS BY MEANS OF STRAIN GAGES

BACKGROUND OF THE INVENTION

German Publication No. 2 301 186 discloses a load test apparatus provided with strain gages measuring the bending stress of a crane beam as the actual value indicator. In this load test apparatus, the strain gages are located above and below a cross piece connecting two plates. The bending stress of the crane beam is transmitted from the plates to the cross piece, and is determined by the strain gages as deflection. This known actual value indicator is difficult to manufacture, and allows for an abundance of erroneous test results. Also, great expenditures are required to surround this apparatus with a sealed housing in the area of the strain gages, protecting the latter from moisture and damage.

It has also been attempted to utilize diaphram gages for hoisting units, which will, for example, close a break contact when the compression spring in the gage is compressed by a certain degree under the effect of the load. The disadvantage of such diaphragm gages is their relatively great requirement for space, and expenditure in manufacturing.

STATEMENT OF THE INVENTION

It is the object of the invention to design a simple, accurate and enduring load test apparatus for hoisting units which can be easily manufactured in large quantities. This is achieved by attaching at least one strain gage directly at a test piece arranged between the end of the hoisting element, and a fixed point on the hoisting unit, and being subjected to expansion under the effect of the load. The proposed test piece forms a simple small component which can be manufactured in great numbers at low cost. The strain gage is suitably glued on so that the workpiece may be placed in a furnace for complete hardening of the glue.

The hoisting element is mounted with bolts on the test piece, and the test piece in turn on the hoisting unit, such bolts entering boreholes in the test piece, so that the test piece section located between the boreholes has a cross section constriction to allow for the placement of the strain gages. Preferably, the test piece consists of a flat profile made of highly resistant tool steel and can easily be provided with a cross section constriction in the test area where the strain gages may be glued on.

In a further development of the invention, the test piece may have a longitudinal slot between the boreholes. In that case, the strain gages are arranged along the sides of the longitudinal slot, on both lateral strips preferably on the front and rear of the test piece. As force is introduced into the test piece at the borehole rims facing away from one another and the lines of force run next to the boreholes toward the other borehole, the longitudinal slot ensures that the lines of force between the boreholes do not extend over the entire width of the test piece, so that they are dispersed indefinitly in the area between the boreholes. The lines of force, due to the longitudinal slot, are distributed evenly over the two lateral or side strips which are ideal for defining the exact test area. Each test surface is provided with a strain gage pair, making a total of four pairs, which are interconnected via test lines to form a bridge connection while interposing resistances.

The invention includes surrounding the test piece in the area of the strain gages with a tight or sealed housing protecting the strain gages with lines and resistances from humidity and mechanical stress. The housing is preferably made up of two shell halves with flanges adhering to each other, and in the area of the test piece adhering to the latter. The shell halves of the housing are uniform, and each embrace the test piece on one flat side and one narrow side with their flanges, and extend from the narrow side via an oblique projection to the entire depth of the housing, and from the flat side via an oblique recess to a level part of the housing, so that the oblique projection of one housing half rests with its flange at the flange of the oblique recess of the other housing half. Both housing halves fit onto one another easily and their flanges embrace the test piece. The flanges of the housing halves are attached to one another, as well as to the test piece, by soldering or gluing. Since the test piece expands in the area of the cross section constriction and such expansion is to be transferred to the housing resting immediately next to it, the flat part of the housing is provided with membrane-type grooves for expansion running at right angles with the test piece. A sealed plug contact for test lines leads through the wall of one housing half.

The boreholes of the test piece are penetrated by bolts which are provided on both sides of the test piece with spacers, and which reach into boreholes of the hoisting element carrying devices. The lower borehole of the hoisting element carrying device is larger than the diameter of the bolt, so that the test piece can freely expand under stress. Preferably, the hoisting element carrying device consists of a wedge-shaped cable cross beam, and the test piece is arranged between its side plates. The spacers position the test piece, surrounded by its housing, between the side plates of the wedge-shaped cross beam, permitting limited rotation of the test piece. Such possibility for rotation is less in the area of the lower bolt than in the upper bolt area, so that the rotation emanating from the hoisting element, usually a steel cable, is limited in the lower bolt area and does not lead to twisting of the test piece which would result in distortion of the test results.

The test piece bolt goes through the lower boreholes of the hoisting element carrying device and it, therefore, doubles as a crash guard in case the test piece breaks in the area of its constriction. In order to eliminate bending stress during oscillation of the test piece, the boreholes for the bolts are rounded out spherically. Thus the test piece merely transmits tensile forces in the test area and remains free from all other types of stress. Thus, the kind of test accuracy required in hoisting units is possible even if loads oscillate or swing.

An example of the invention is illustrated on the drawings and discussed as follows:

DETAILED DESCRIPTION OF THE INVENTION

Figures 1, 2, 3:
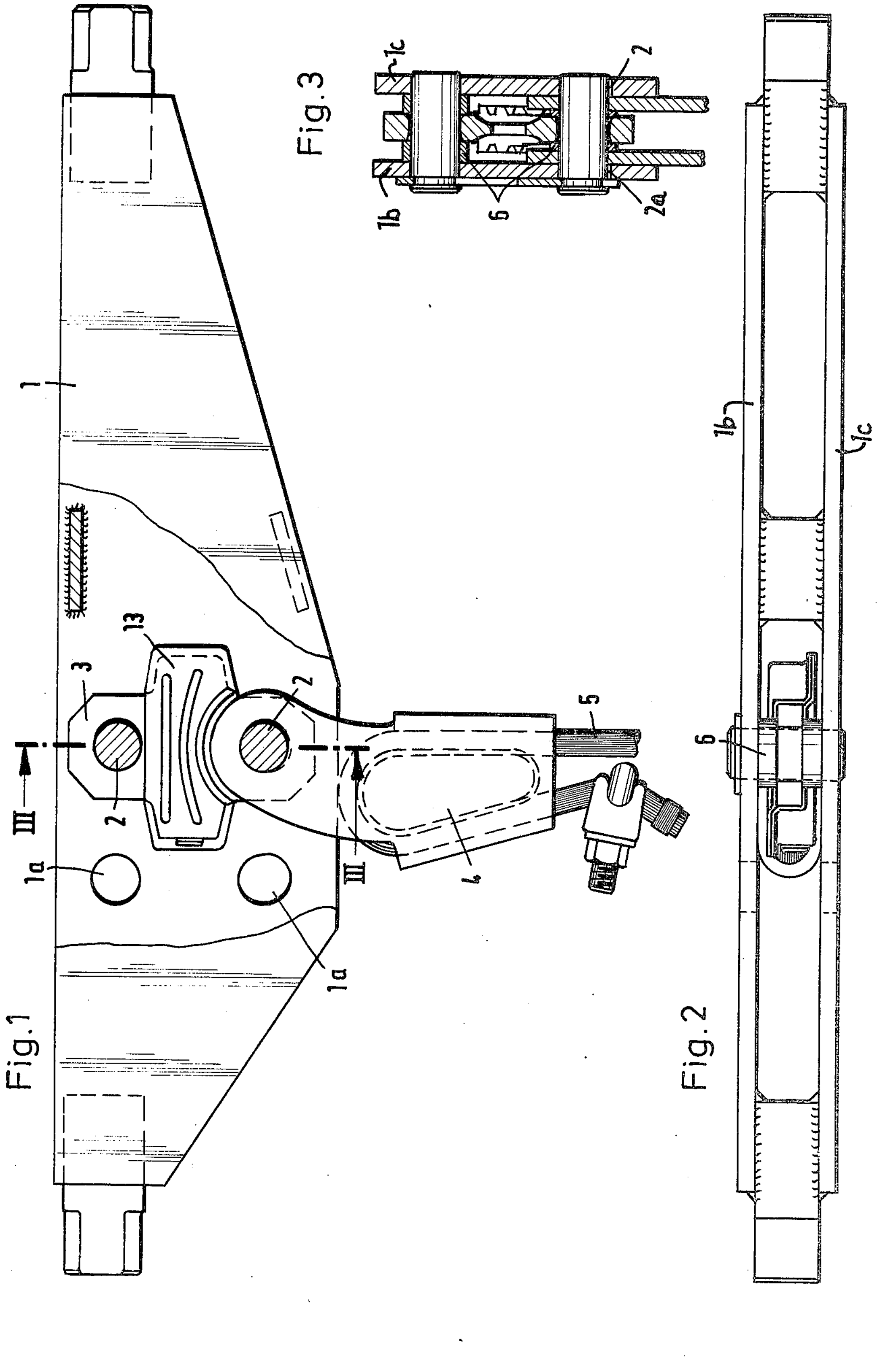
FIG. 1 is a side elevational view of a hoisting apparatus illustrating the invention, partially broken away to show the test cell mounting.
FIG. 2 is a top plan view of the apparatus of FIG. 1.
FIG. 3 is a cross sectional view taken along lines III—III of FIG. 1.

FIG. 1 shows the wedge-shaped cable cross beam 1 in profile with a cut-out portion of the front side plate, for the illustration of the test piece 3 contained in a housing 13. The upper borehole 1'a for bolt 2 matches the bolt diameter, while the lower borehole 1*a* is an enlarged hole to permit settling of the lower bolt 2 by about 2 mm. The lower bolt 2 has a hoisting element appendage 4 consisting of a thimble for the hoisting element 5 consisting of a cable. In accordance with the drawing, test piece 3 is suspended from the right borehole 1*a* if the hoisting unit has two cable strands, and from the left borehole in the case of four cable strands. This decreases the number of types of the wedge-shaped cable cross beams required.

FIG. 3 shows the test piece 3 positioned between the side plates 1*b* and 1*c* of the wedge-shaped cable cross beam 1 and/or hoisting element appendage 4 via spacers 6. Furthermore, it shows a gap 2(*a*) formed by the bolt hole below lower bolt 2, which permits the lower bolt 2 to drop by about 2 mm, and at the same time prevents the bolt from breaking if test piece 3 breaks in the test area.

Figure 4:
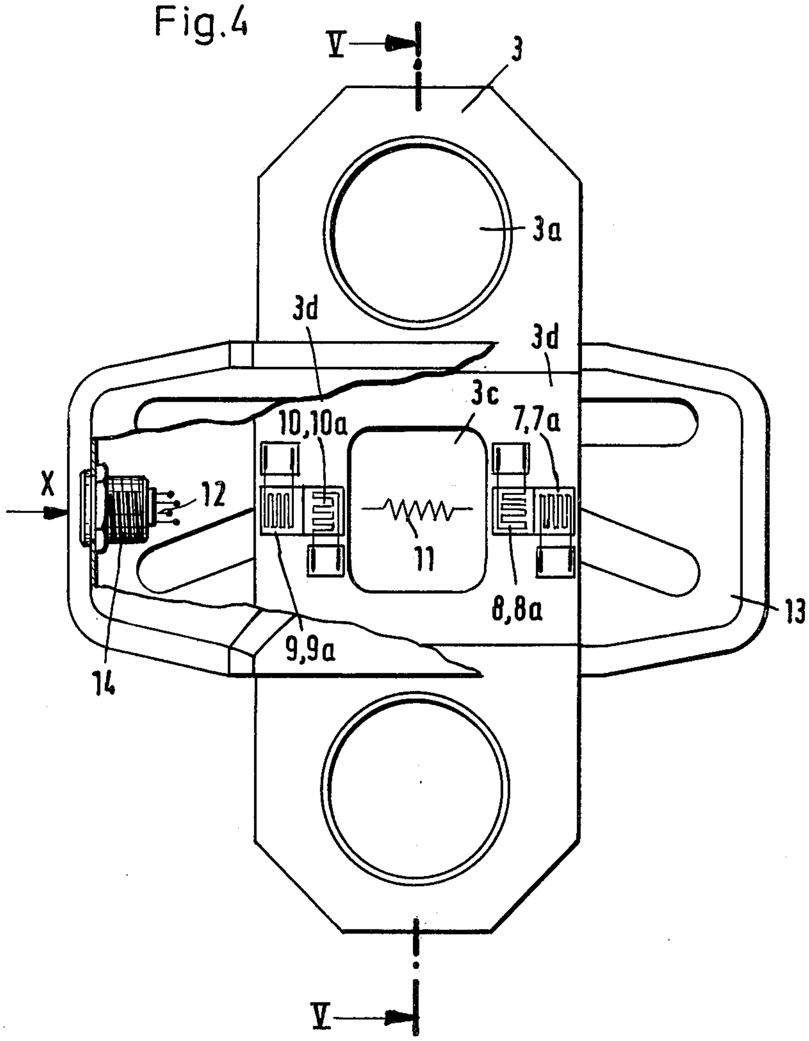
FIG. 4 is an enlarged detailed side elevational view of the test piece or cell of the invention.
Figure 5:
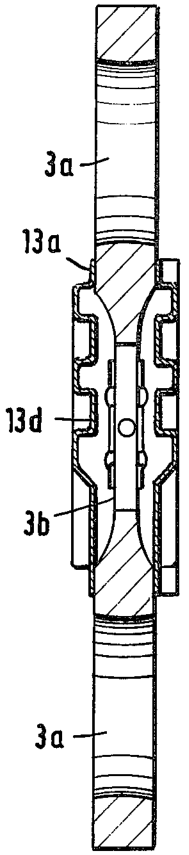
FIG. 5 is a cross sectional view taken along lines V—V of FIG. 4.
Figure 6:
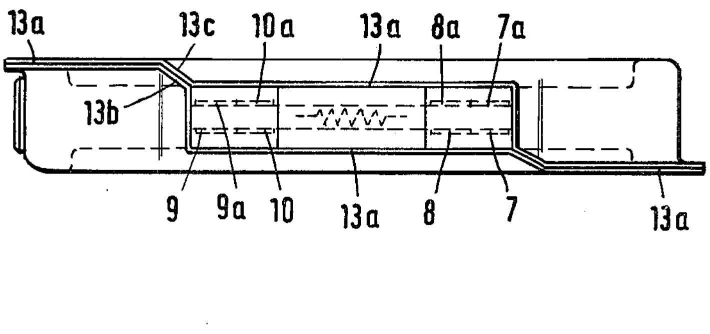
FIG. 6 is a top plan view of the apparatus of FIG. 4.
Figure 7:
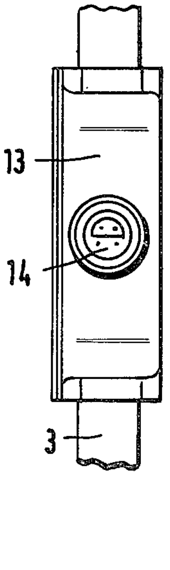
FIG. 7 is a view of FIG. 4 in the direction of the arrow X.

FIGS. 4 and 5 show test piece 3 consisting of flat steel with spherical boreholes 3*a*, and a longitudinal slot 3*c* in the area of the cross section narrowing or constriction shown in FIG. 5. Two side strip sections 3*d* next to the longitudinal slot 3*c* permit gluing of the strain gages 7 through 10*a*. FIGS. 4 and 6 show that in each case one strain gage strip chart pair is used, whereby the strain gages 7, 7*a*, 9 and 9*a* arranged on the outside are subject to length expansion and strain gages 8, 8*a*, 10 and 10*a* are alternatively slightly compressed when the test area expands. Resistances 11 required for testing are arranged in the area of the longitudinal slot 3*c*. Test lines 12 leading to the strain gages go through a plug contact 14 of the housing 13.

FIG. 4 furthermore shows the housing 13 for the strain gages, test lines, and resistances, in profile. Flanges 13*a* of housing 13 resting at the test piece 3, and expansion grooves 13*d* can be seen on FIG. 5. In FIG. 6, it will be seen that each half of the housing is joined to the other half at end flange 13*a*, with the joined flange portions 13*a* connected to the remaining portions of the housing by opposed oblique portions 13*b*, 13*c*. FIG. 5 also shows that the expansion grooves 13*d* are not depressed quite up to the test piece thickness.

Figure 8:
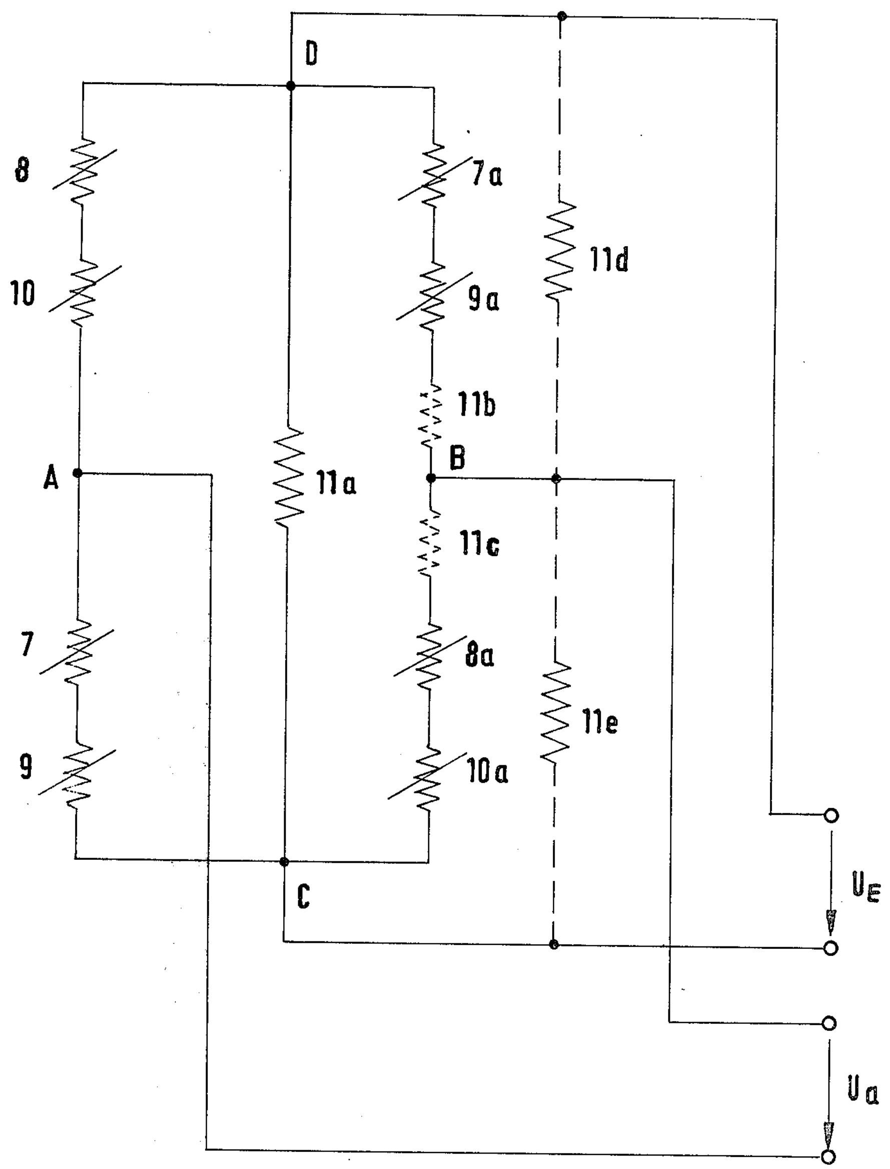
FIG. 8 is a wiring diagram of the bridging circuit between the test cell gages and the drive for the hoisting unit.

FIG. 8 is the wiring arrangement for the strain gages and resistances. The spacing arrangement of strain gages 7 and 9, arranged successively to measure length expansion, can be seen in FIGS. 4 and 6. Diagonally across are the other strain gages 7*a* and 9*a* to measure length expansion. The strain gages 8 and 10, as well as 8*a* and 10*a*, for measuring the compression with cross section constriction are arranged in the other strands of the bridge connection.

When stretching the lateral strips of the test piece, the strain gages 7, 9, as well as 7*a* and 9*a*, expand and their electric resistances increase, while the strain gages 8 and 10, as well as 8*a* and 10*a*, are slightly compressed and their electric resistances decrease. A voltage differential is caused between points A and B, and its extent is affected by resistance 11*a*. In order to compensate for internal resistances of the strain gages, balancing resistances 11*b* or 11*c* are arranged in series. Further balancing resistances 11*e* or 11*d* may be arranged parallel with strain gages 8*a* and 10*a* or 7*a* and 9*a*.

We claim:

1. In load testing apparatus for a hoist comprising
(a) a plurality of strain gages; and
(b) circuity means for connecting said strain gages to a motor for said hoist; characterized by
(c) a fixed hoist support beam;
(d) hoisting cable means;
(e) an expansible elongated flat test piece connected between said hoist support beam and said hoisting cable means;
(f) said strain gages disposed on said test piece;
(g) a pair of bolt holes in said test piece and said fixed beam, said bolt holes vertically spaced from each other;
(h) bolts for connecting the top portion of said test piece to said fixed beam and the bottom portion thereof to said fixed beam and said hoisting cable means;
(i) an intermediate portion on said test piece disposed between said bolt holes, said intermediate portion of said test piece being of reduced cross section in relation to said top and bottom portions;
(j) a slot in said intermediate portion between said bolt holes;
(k) said slot defining strips on each side thereof in said intermediate portion;
(l) said strain gages disposed on said strips on each side of said test piece; and
(m) a sealed housing covering said intermediate portion, said housing comprising
  (1) two opposed housing shell halves;
  (2) each said shell half having a flange at each edge thereof;
(3) each of said flanges adhered to the opposing flange to form a pair of joined flanges at each end of said housing; and
  (4) one side of each pair of joined flanges adhered to said test piece.

2. The apparatus of claim 1, further characterized by
(a) a bridge connection in said circuity means; and
(c) each of said strain gages are connected to said bridge connection.

3. The apparatus of claim 1, further characterized by
(a) each of said flanges at each edge of each housing shell extends in a plane parallel with said shell but spaced from said shell;
(b) each of said flanges includes an oblique intermediate flange portion joining each of the said flanges to its respective shell edge; and
(c) each said intermediate flange portion extends oblique to its respective flange and shell.

4. The apparatus of claim 1, further characterized by
(a) each of said shells is adhered to each other and said test piece by soldering.

5. The apparatus of claim 1, further characterized by
(a) each of said shells is adhered to each other and said test piece by gluing.

6. The apparatus of claim 1, further characterized by
(a) expansion grooves in each of said shells; and
(b) said grooves extending at right angles to the longitudinal extent of said test piece.

7. The apparatus of claim 1, further characterized by
(a) a sealed plug in said circuity; and
(b) said sealed plug positioned in one of said shells.

8. The apparatus of claim 1, further characterized by
(a) said fixed support beam comprised of a pair of spaced apart side plates;
(b) said test piece extending between said side plates;
(c) spacers disposed around each of said bolts between said test piece and each of said side plates.

9. The apparatus of claim 8, further characterized by
(a) said lower bolt hole in said spaced side plates is of greater diameter than said bolt extending therethrough.

10. The apparatus of claim 8, further characterized by
(a) said fixed support beam is wedge-shaped.

11. The apparatus of claim 8, further characterized by
(a) said lower bolt hole in said test piece is spherically rounded out.

* * * * *